United States Patent
Motouchi

(10) Patent No.: US 7,568,473 B2
(45) Date of Patent: Aug. 4, 2009

(54) AUXILIARY-GAS SUPPLYING APPARATUS FOR COMBUSTION ENGINE

(75) Inventor: Kazuo Motouchi, Kobe (JP)

(73) Assignees: Kazou Motouchi, Kobe-Shi (JP); Kyoko Motouchi, Kobe-Shi (JP); Sakoto Fujiwara, Kobe-Shi (JP)

( * ) Notice: Subject to any disclaimer, the term of this patent is extended or adjusted under 35 U.S.C. 154(b) by 0 days.

(21) Appl. No.: 12/213,101

(22) Filed: Jun. 13, 2008

(65) Prior Publication Data

US 2008/0257285 A1 Oct. 23, 2008

Related U.S. Application Data

(63) Continuation of application No. PCT/JP2005/022970, filed on Dec. 14, 2005.

(51) Int. Cl.
*F02M 25/12* (2006.01)
*F02M 27/04* (2006.01)
*F02M 35/10* (2006.01)

(52) U.S. Cl. .................. 123/536; 123/539; 60/274; 60/275

(58) Field of Classification Search ......... 123/536–539, 123/3; 60/274, 275
See application file for complete search history.

(56) References Cited

U.S. PATENT DOCUMENTS 4,069,665 A * 1/1978 Bolasny .................. 60/275
4,308,844 A * 1/1982 Persinger .................. 123/539
4,519,357 A 5/1985 McAllister
6,912,841 B2 * 7/2005 Pfendtner et al. ............. 60/275
2004/0107695 A1 6/2004 Cho et al.
2006/0005531 A1 * 1/2006 Calvo et al. .................. 60/275

FOREIGN PATENT DOCUMENTS

| JP | 59-136555 A | 8/1984 |
|---|---|---|
| JP | 63-192950 A | 8/1988 |
| JP | 5-44584 A | 2/1993 |
| JP | 2002-276404 A | 9/2002 |
| JP | 2004-218613 A | 8/2004 |
| JP | 2005-264776 A | 9/2005 |

* cited by examiner

*Primary Examiner*—M. McMahon
(74) *Attorney, Agent, or Firm*—Birch, Stewart, Kolasch & Birch, LLP

(57) ABSTRACT

An auxiliary-gas supplying apparatus A for combustion engine B according to the invention includes: an ozone generator 3; an auxiliary gas generator 8 for generating an auxiliary gas containing ionized oxygen; and an intake auxiliary-gas supply path 4 for supplying the auxiliary gas to an intake member (intake manifold) 1, the ozone generator, auxiliary gas generator and intake auxiliary-gas supply path disposed externally of the intake member (intake manifold) 1 communicated with a combustion chamber. Thus, the combustion engine may be increased in combustion efficiency.

5 Claims, 7 Drawing Sheets

AUXILIARY-GAS SUPPLYING APPARATUS FOR COMBUSTION ENGINE

This application is a Continuation of copending PCT International Application No. PCT/JP2005/022970 filed on Dec 14, 2005, which designated the United States, and on which priority is claimed under 35 U.S.C. § 120. The entire contents of each of the above documents is hereby incorporated by reference.

TECHNICAL FIELD

The present invention relates to an auxiliary-gas supplying apparatus for combustion engine, such as an internal combustion engine mounted in automotive vehicles, diesel vehicles and the like.

BACKGROUND ART

In order to reduce fuel consumption and air pollution by increasing the combustion efficiency of the internal combustion engine which is a kind of combustion engine, it has been a conventional practice to supply ozone, as an auxiliary gas for a mixture including a fuel and air (an air-fuel mixture), to an intake path of the internal combustion engine. For instance, Japanese Unexamined Patent Publication No. H5-44584 (Paragraph No. 0008 and FIG. 1) discloses an internal combustion engine wherein a corona-discharge ozone generator is disposed in an intake manifold as an intake member. The ozone generated by the ozone generator is used for activating oxygen present in the air-fuel mixture sucked in the intake manifold, thereby increasing the combustion rate of the air-fuel mixture.

DISCLOSURE OF THE INVENTION

Problems to Be Solved by the Invention

More recently, the fuel injection system of the internal combustion engine is shifting from a carburetor system to an electronic fuel injection system. Particularly in the internal combustion engine of the electronic fuel injection system, the intake manifold is an important element in deciding the quantities and distribution of the air-fuel mixture to be supplied to the respective cylinders of the internal combustion engine. The performance of the internal combustion engine significantly depends upon the quality of the intake manifold. In this connection, the intake manifold is so designed as to distribute the air-fuel mixture to the respective cylinders as evenly as possible. However, the internal combustion engine disclosed in Japanese Unexamined Patent Publication No. H5-44584 has the following problem. The intake manifold contains therein the ozone generator, which interferes with a smooth flow of the air-fuel mixture through the intake manifold. This makes it impossible to evenly distribute the air-fuel mixture to individual branch pipes and hence, the internal combustion engine suffers the decrease of combustion efficiency.

The recent trend of the intake manifold is moving from a metal intake manifold toward a synthetic-resin intake manifold in pursuit of reduction in weight, reduction of flow resistance to the air-fuel mixture moving through the path and the like. However, the internal combustion engine disclosed in Japanese Unexamined patent Publication No. H5-44584 is designed on assumption that the intake manifold is made from metal. Therefore, the internal combustion engine is not effectively increased in the combustion efficiency if the synthetic-resin intake manifold is used in place of the metal intake manifold and the ozone generated by the ozone generator disposed in the intake manifold is directly supplied.

In view of the foregoing problems, it is an object of the invention to provide an auxiliary-gas supplying apparatus for combustion engine, which is capable of effectively increasing the combustion efficiency of the combustion engine.

Means for Solving the Problems

The present inventors have made intensive studies particularly focusing on the use of ozone for effectively increasing the combustion efficiency of the combustion engine, such as the internal combustion engine. In the study process, the inventors found that the effect of ozone increasing the combustion efficiency of the combustion engine differs greatly between a case where the combustion engine employs the metal intake manifold (intake member) and a case where the combustion engine employs the synthetic-resin intake manifold. The inventors inferred that such a difference is attributable to surface roughness of an internal surface of the intake manifold. The inventors have further studied based on this inference to find a breakthrough on the problem. That is, the ozone generated by the ozone generator may be forcibly decomposed before supplied to the intake manifold, so that an auxiliary-gas containing ionized oxygen may be generated. The resultant auxiliary-gas may be supplied to the intake manifold to increase the combustion rate of the air-fuel mixture, whereby the internal combustion engine may be effectively increased in the combustion efficiency. Thus, the inventors have accomplished the invention.

According to the invention, an auxiliary-gas supplying apparatus for combustion engine disposed externally of an intake member communicated with a combustion chamber, comprises: an ozone generator for generating ozone by using air; an auxiliary gas generator for generating an auxiliary gas containing ionized oxygen by forcibly decomposing at least a part of the ozone generated by the ozone generator; and an intake auxiliary-gas supply path for supplying the auxiliary gas which is generated by the auxiliary gas generator and which contains the ionized oxygen, to the intake member.

According to the above constitution, the ozone is generated by the ozone generator and thereafter, at least a part of the ozone is forcibly discomposed to generate the auxiliary gas containing the ionized oxygen, and the auxiliary gas is supplied to the intake member. Therefore, the air-fuel mixture is mixed with the ionized oxygen so as to activate the air-fuel mixture. Since the ozone generator and the auxiliary gas generator are disposed externally of the intake member, the apparatus does not involve a fear of interfering with the smooth flow of the air-fuel mixture through the intake member.

The phase "forcibly decompose" as used herein means decomposing the ozone at a higher rate than a case where ozone is left as it is to be decomposed naturally. The ozone, which is an instable substance, is naturally decomposed as left as it is. However, the invention is adapted to decompose the ozone more quickly as compared with the case where the ozone is simply left as it is to be decomposed naturally.

It is preferred in the above auxiliary-gas supplying apparatus for combustion engine that the intake member is an intake manifold, and that the intake auxiliary-gas supply path is in discrete communication with individual branch pipes of the intake manifold. In this case, the auxiliary gas containing the ionized oxygen can be discretely supplied to the individual branch pipes of the intake manifold through the intake auxiliary-gas supply path. This permits the auxiliary gas to be evenly supplied to the respective branch pipes, so that the combustion engine can be more effectively increased in the combustion efficiency. The increased combustion efficiency also leads to an advantage that harmful components in an exhaust gas are reduced in quantity.

It is further preferred in the above auxiliary-gas supplying apparatus for combustion engine that the intake member is an intake manifold, and that the intake auxiliary-gas supply path includes a branch path for supplying the auxiliary gas through plural circumferential places of a collecting pipe of the intake manifold or of an intake pipe communicated with the collecting pipe. In this case, the air-fuel mixture containing the auxiliary gas can be supplied in an easily homogenized state as compared with a case where the air-fuel mixture is mixed with the auxiliary gas supplied through one place. Therefore, the combustion engine can be more effectively increased in the combustion efficiency. In addition, the increased combustion efficiency also leads to the advantage that the harmful components in the exhaust gas are reduced in quantity.

It is preferred in the above auxiliary-gas supplying apparatus for combustion engine that the auxiliary gas generator is constructed by spirally winding a tubular body including a plurality of bulges protruded inwardly from an inside wall thereof. In this case, it is easy to obtain the auxiliary gas containing the ionized oxygen by forcibly decomposing at least a part of the ozone generated by the ozone generator. This constitution is also advantageous in that the auxiliary gas generator has a compact structure.

The above auxiliary-gas supplying apparatus for combustion engine can provide an even greater effect to increase the combustion efficiency of the combustion engine if the intake member is made from a synthetic resin.

It is preferred that the above auxiliary-gas supplying apparatus for combustion engine further comprises an exhaust auxiliary-gas supply path for supplying the auxiliary gas which is generated by the auxiliary gas generator and which contains the ionized oxygen, to an exhaust path. In this case, the auxiliary gas can be supplied to the exhaust path by way of the exhaust auxiliary-gas supply path and hence, the harmful components in the exhaust gas can be reduced by the ionized oxygen present in the auxiliary gas. This results in a more effective reduction of the quantities of the harmful components.

BEST MODES FOR CARRYING OUT THE INVENTION

Figure 1:
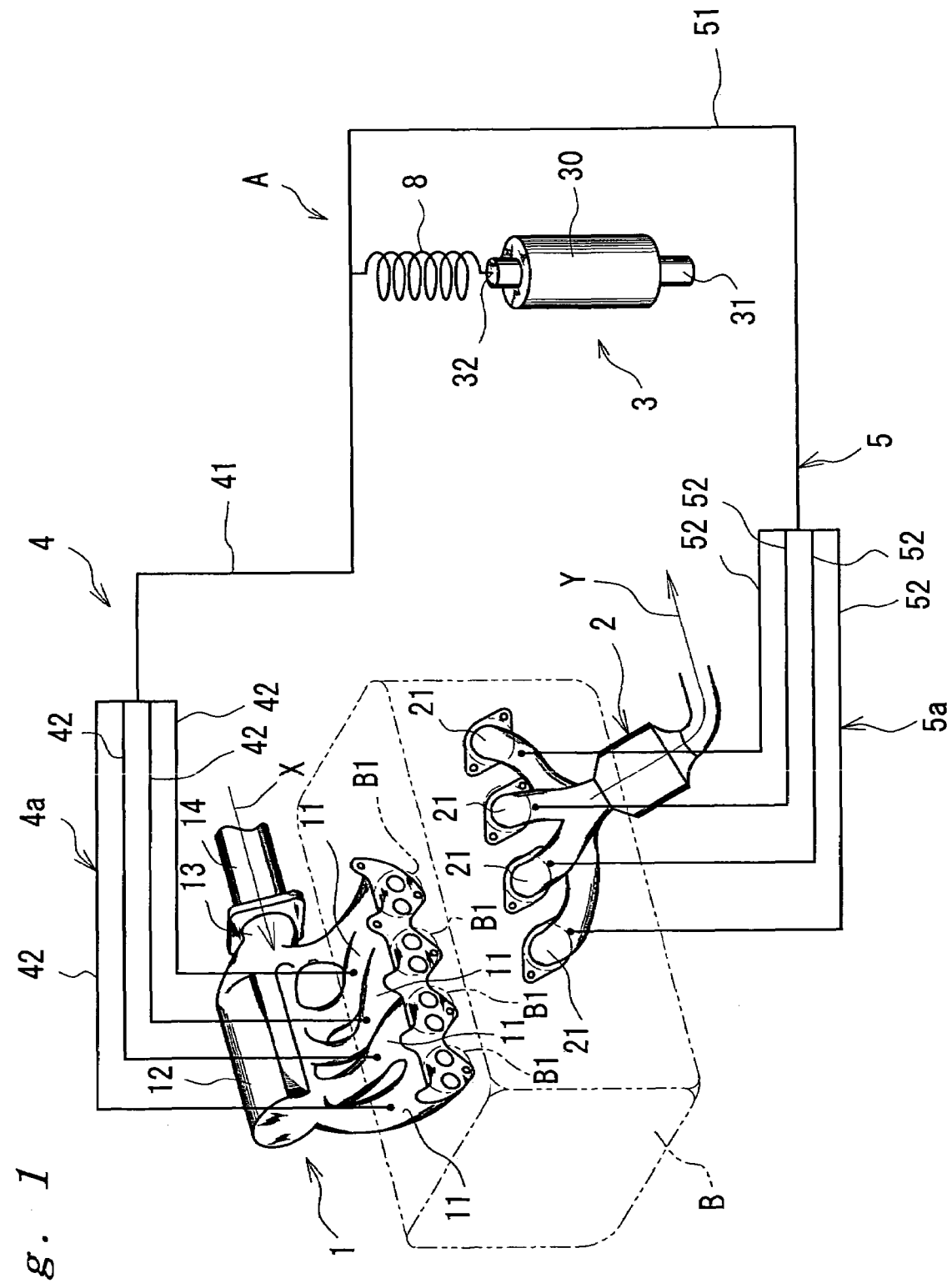
FIG. 1 is a schematic perspective view showing an auxiliary-gas supplying apparatus for internal combustion engine according to a first embodiment of the invention.

The preferred embodiments of the invention will hereinafter be described with reference to the accompanying drawings. FIG. 1 is a schematic perspective view showing an auxiliary-gas supplying apparatus for internal combustion engine according to a first embodiment of the invention.

The auxiliary-gas supplying apparatus A for an internal combustion engine B according to the embodiment serves to supply an auxiliary gas for a mixture including a fuel and air to a synthetic-resin intake manifold (intake member) 1 and an exhaust manifold (exhaust member) 2, which are communicated with a combustion chamber constituting the internal combustion engine B. The auxiliary-gas supplying apparatus includes: an ozone generator 3 disposed externally of the intake manifold 1; an auxiliary gas generator 8 disposed externally of the intake manifold 1 and decomposing the ozone generated by the ozone generator 3 thereby generating the auxiliary gas containing ionized oxygen; an intake auxiliary-gas supply path 4 for supplying the auxiliary gas generated by the auxiliary gas generator 8 to individual branch pipes 11 of the intake manifold 1; and an exhaust auxiliary-gas supply path 5 for supplying the auxiliary gas to individual branch pipes 21 of the exhaust manifold 2.

Figure 2:
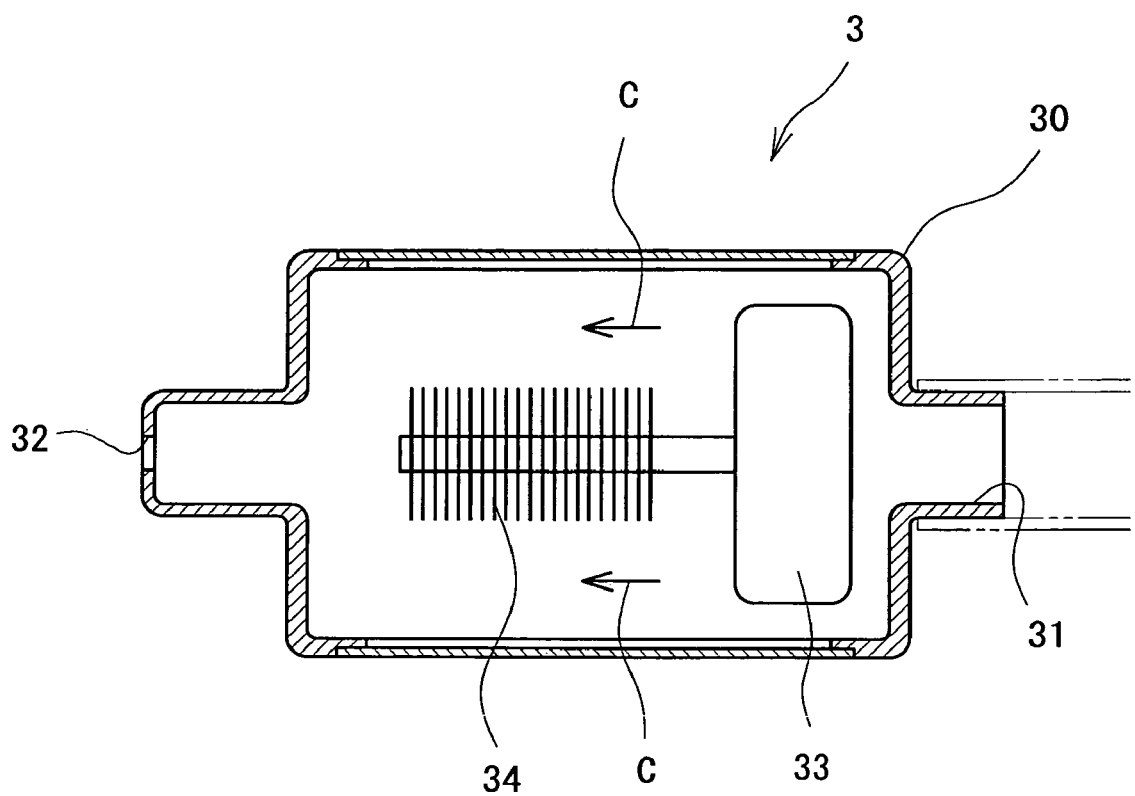
FIG. 2 is a sectional view of an ozone generator.

As also shown in FIG. 2, the ozone generator 3 is constituted as follows. A cylindrical casing 30 has an inlet port 31 connected with an unillustrated air cleaner at one end thereof, and an outlet port 32 at the other end of the casing 30. A space between these inlet port 31 and outlet port 32 defines an air flow path C. A high-voltage generator 33 is disposed on an upstream side of the air flow path C, whereas an electrode 34 is disposed on a downstream side thereof. In the ozone generator 3, air is introduced into the casing 30 through the inlet port 31 by way of a negative pressure in the intake manifold 1 and the ozone is generated from the introduced air by way of corona discharge from the electrode 34.

Figure 3:
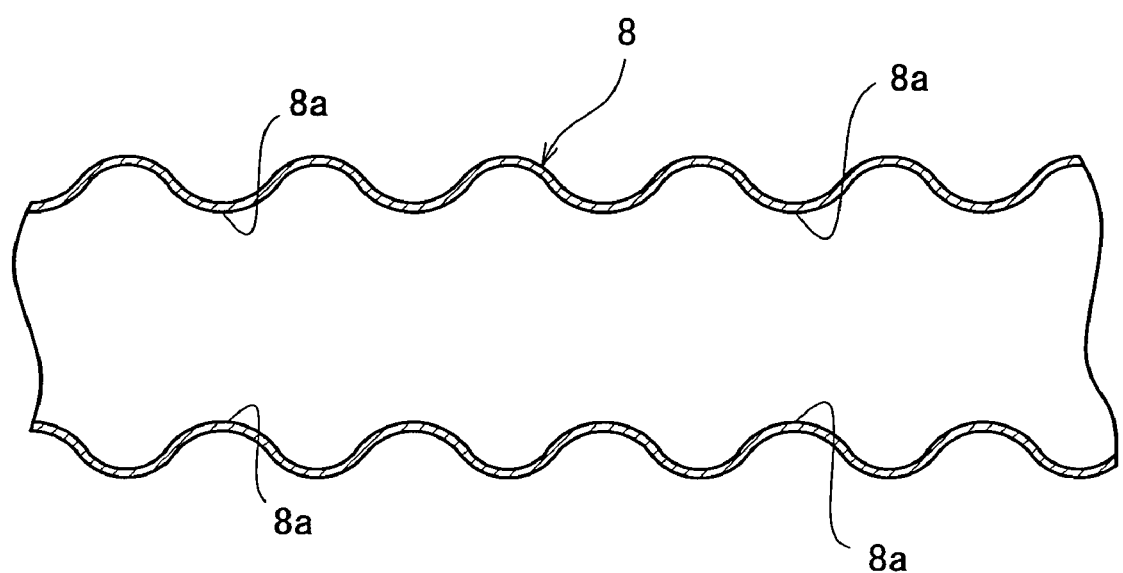
FIG. 3 is a fragmentary sectional view of an auxiliary gas generator.

The auxiliary gas generator 8 forcibly decomposes at least a part of the ozone generated by the ozone generator 3, so as to generate the auxiliary gas containing ionized oxygen. The auxiliary gas generator 8 is described in more details also referring to FIG. 3. The auxiliary gas generator 8 is constructed by winding a bellows-like tubular body into a spiral form. The tubular body has a plurality of bulging ridges (bulges) 8*a* protruded inwardly from an inside wall thereof and extended circumferentially. In the auxiliary gas generator 8 having such a construction, a flow resistance based on the bulging ridges and the spiral configuration is applied to the flow of air containing the ozone generated by the ozone generator 3, whereby at least a part of the ozone is forcibly decomposed to form ionized oxygen (including both ionized oxygen atoms and ionized oxygen molecules). That is, the auxiliary gas containing the ionized oxygen can be generated.

It is noted that the auxiliary gas generator 8 of the invention is not limited to the above-mentioned tubular body having the spiral form but may include other various devices designed to bring the ozone-containing air flow into collision against the wall thereof and the like for applying the flow resistance to the air flow, thereby forcibly decomposing at least a part of the ozone. Instead of the constitution wherein the flow resistance is applied to the air flow thereby decomposing the ozone, the auxiliary gas generator may also have an alternative constitution, for example, wherein a catalyst layer containing various catalysts capable of promoting the ozone decomposition (or forcibly decomposing ozone) is formed on the internal surface of the tubular body.

Returning to FIG. 1, the intake auxiliary-gas supply path 4 includes: a first supply pipe 41 connected with the auxiliary gas generator 8; and a plurality of second supply pipes 42 branched from the first supply pipe 41 to define a branch path 4a. The second supply pipes 42 are provided in one-on-one relation with branch pipes 11 corresponding to respective intake ports B1 of the intake manifold 1. A distal end of each of the second supply pipes is connected to an intermediate portion of each of the branch pipes 11.

The exhaust auxiliary-gas supply path 5 includes: a first supply pipe 51 connected with the auxiliary gas generator 8; and a plurality of second supply pipes 52 branched from the first supply pipe 51 to define a branch path 5a. The second supply pipes 52 are provided in one-on-one relation with branch pipes 21 corresponding to respective exhaust ports of the exhaust manifold 2. A distal end of each of the second supply pipes is connected to an intermediate portion of each of the branch pipes 21.

In the auxiliary-gas supplying apparatus A for the internal combustion engine B according to the embodiment, the ozone generator 3 generates ozone, while the auxiliary gas generator 8 forcibly decomposes at least a part of the ozone so generated, so as to generate the auxiliary gas containing ionized oxygen. Therefore, the combustion efficiency of the internal combustion engine B can be increased effectively. More specifically, when the auxiliary gas is added to the mixture including the fuel and air (the air-fuel mixture) the ionized oxygen in the auxiliary gas activates the air-fuel mixture. Therefore, the air-fuel mixture can be favorably combusted in the combustion chamber constituting the internal combustion engine B. Furthermore, the auxiliary-gas supplying apparatus A for the internal combustion engine B according to the embodiment has the ozone generator 3 and the auxiliary gas generator 8, which are disposed externally of the intake manifold 1. Therefore, the apparatus does not involve a fear that these devices interfere with the smooth flow of the air-fuel mixture through the intake manifold 1. Accordingly, the air-fuel mixture can be evenly distributed to the respective branch pipes of the intake manifold 1. The ozone generator 3 is in discrete connection with the individual branch pipes 11 of the intake manifold 1 through the intake auxiliary-gas supply path 4 including the branch path 4a, so that the auxiliary gas obtained by the above-mentioned ozone generator 3 and auxiliary gas generator 8 can be discretely supplied to the branch pipes 11 of the intake manifold 1. Therefore, the auxiliary gas can be evenly distributed to the respective intake ports B1 of the internal combustion engine B. Because of these factors, the air-fuel mixture in the combustion chamber is increased in the combustion rate so that the internal combustion engine B is effectively increased in the combustion efficiency. In addition, the increased combustion efficiency of the internal combustion engine B also leads to an advantage of reducing the quantity of harmful components in an exhaust gas. The invention offers a more significant effect in a case where a large quantity of ozone is supplied to the engine.

According to the embodiment, the auxiliary gas can be supplied to the branch pipes 21 of the exhaust manifold 2 through the above-mentioned exhaust ozone supply path 5 and hence, the harmful components in the exhaust gas through the branch pipes 21 can be reduced in quantity. More specifically, the harmful components in the exhaust gas can be made harmless by the ionized oxygen present in the auxiliary gas, so that the exhaust gas is reduced in the content of the harmful components. In combination with the advantage that the combustion efficiency is effectively increased by the auxiliary gas supplied to the intake manifold 1, this advantage provides the effective reduction of the quantity of the harmful components in the exhaust gas. Furthermore, the ozone generator 3 is in discrete connection with the individual branch pipes 21 of the exhaust manifold 2 through the exhaust auxiliary-gas supply path 5 including the branch path 5a and hence, the auxiliary gas obtained by the above-mentioned ozone generator 3 and auxiliary gas generator 8 can be supplied discretely to the above-mentioned branch pipes 21. Thus, the auxiliary gas can be more effectively supplied to the exhaust gas through the branch pipes 21, so that the quantity of the harmful components in the exhaust gas can be reduced even more effectively.

Now, a verification test conducted by the inventors is described. In this verification test, four types of automotive engines were used to determine the quantities of the harmful components in the exhaust gas. First, an engine A (engine displacement: 0.65 L, fuel: gasoline, travel distance: 48700 km), an engine B (engine displacement: 0.65 L, fuel: gasoline, travel distance: 58000 km), an engine C (engine displacement: 0.65 L, fuel: gasoline, travel distance: 33700 km) and an engine D (engine displacement: 3.96 L, fuel: gasoline, travel distance: 83785 km) were prepared. Next, an ozone generator (corona discharge type) and an auxiliary gas generator were disposed externally of an intake manifold of each of the engines A to D. The auxiliary gas generator had a constitution wherein a bellows-like tubular body (inside diameter: 6 mm, overall length: 3 m) having bulging ridges protruded inwardly from an internal surface thereof and arranged with equal spacing was wound around a cylinder body (length: 20 cm, outside diameter: 3.5 cm). The auxiliary gas generator was connected with an intake auxiliary-gas supply path and an exhaust auxiliary-gas supply path. The intake auxiliary-gas supply path was connected to the respective intermediate portions of branch pipes of the intake manifold. The exhaust auxiliary-gas supply path was connected to the respective intermediate portions of branch pipes of the exhaust manifold (see FIG. 1). Each of the engines A to D was operated for a predetermined length of time in two modes. In one mode, each of the engines was operated with five minute supply of the auxiliary gas containing ionized oxygen (the engine D operated with ten minute supply of the auxiliary gas). The auxiliary gas was generated by the ozone generator generating ozone (500 ppm/min), followed by the auxiliary gas generator forming the gas containing the ionized oxygen. In the other mode, each of the engines was operated without the supply of the auxiliary gas. A gasoline motor vehicle emission analyzer (CO/HC analyzer MEXA-324G commercially available from HORIBA.LTD) was used to determine the quantities of the harmful components in the exhaust gas from each engine operated in each mode. The results are listed in Table 1 below.

TABLE 1

|  |  | Aux. gas supply OFF | | Aux. gas supply ON | |
| --- | --- | --- | --- | --- | --- |
|  |  | CO | CH | CO | CH |
| Engine A | $1^{st}$ run | 0.02 | 70 | 0.00 | 0 |
|  | $2^{nd}$ run | 0.01 | −30 | −0.05 | −50 |
| Engine B | $1^{st}$ run | 0.31 | 300 | 0.02 | 220 |
|  | $2^{nd}$ run | 0.03 | 140 | 0.01 | 60 |
| Engine C |  | 9.69 | 920 | 0.00 | −30 |
| Engine D |  | 0.50 | 120 | 0.00 | −30 |

The following fact is confirmed from the results shown in Table 1. All the engines A to D, supplied with the auxiliary gas, produced exhaust gases containing less harmful components (CO, CH) as compared with the case where the auxiliary gas was not supplied. It is also confirmed that all the engines, supplied with the auxiliary gas, had good combustion efficiencies because of the increased combustion rate of the air-fuel mixture.

Figure 4:
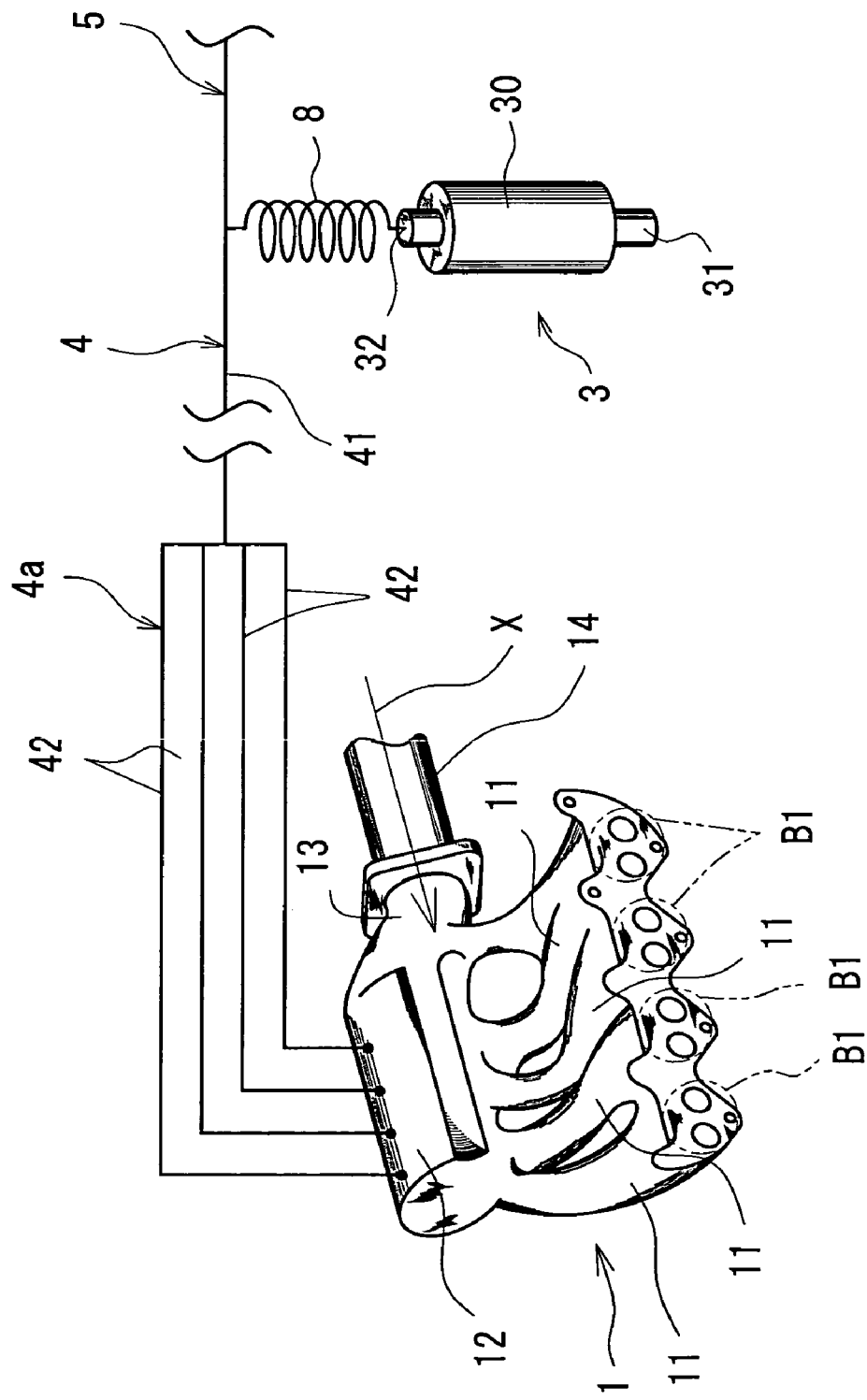
FIG. 4 is a schematic perspective view illustrating a modification of the auxiliary-gas supplying apparatus for internal combustion engine according to the first embodiment of the invention.

It is noted that the second supply pipes 42 constituting the branch path 4a of the above-mentioned intake auxiliary-gas supply path 4 may not be connected only to the intermediate portions of the branch pipes 11 of the intake manifold 1 but may also be connected to any portions, such as ends, of the branch pipes. The above-mentioned second supply pipes 42 may also be connected to portions of a surge tank 12, which correspond to the respective branch pipes 11 (see FIG. 4) In short, the second supply pipes 42 may be connected to any portions of an intake path X, which permit the supply of the auxiliary gas in correspondence to the respective intake ports B1 of the internal combustion engine B.

Figure 5:
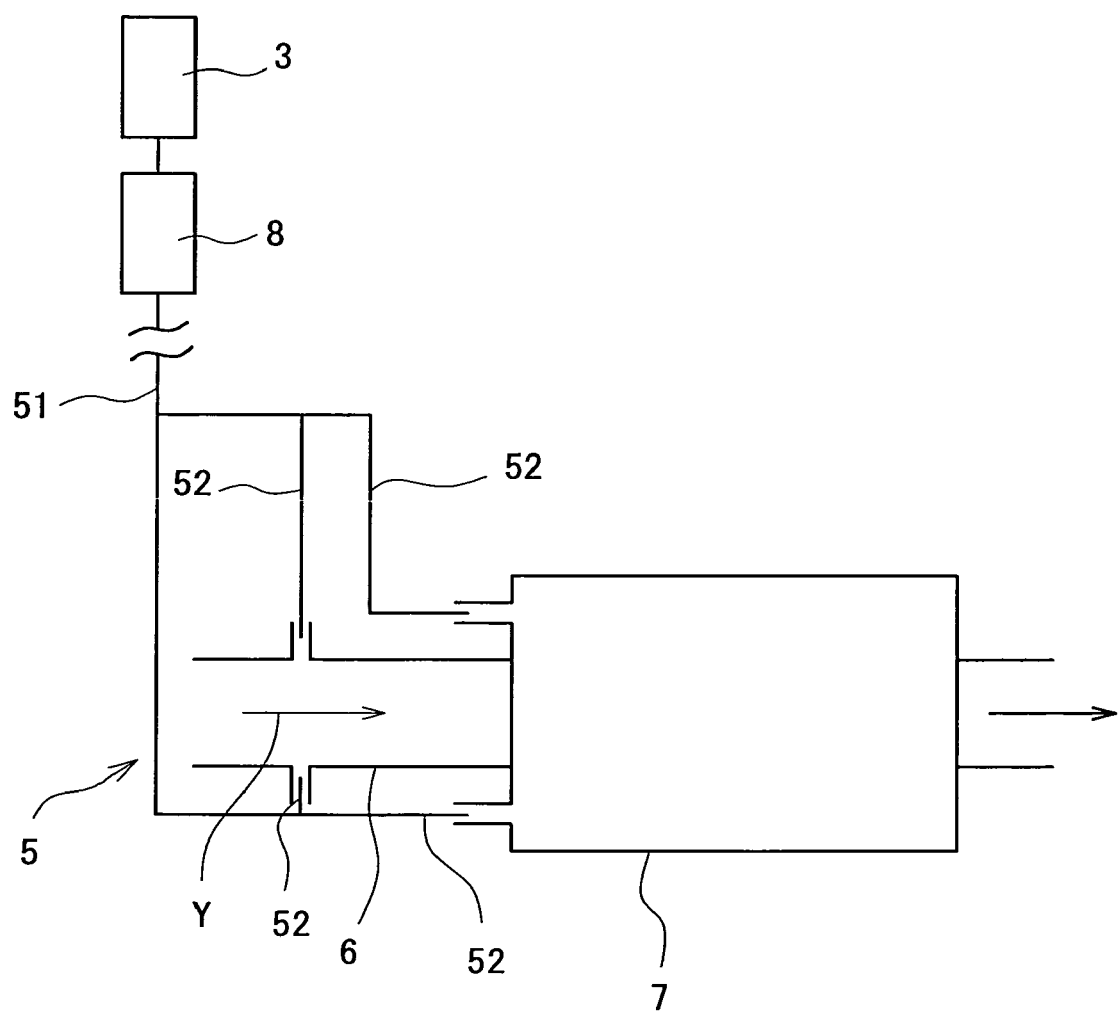
FIG. 5 is a schematic perspective view illustrating another modification of the auxiliary-gas supplying apparatus for internal combustion engine according to the first embodiment of the invention.

Furthermore, the second supply pipes 52 constituting the branch path 5a of the above-mentioned exhaust auxiliary-gas supply path 5 may not be connected only to the intermediate portions of the branch pipes 21 of the exhaust manifold 2 but may also be connected to any portions, such as ends, of the branch pipes. The above-mentioned second supply pipes 52 may also be connected to any portion, such as an exhaust pipe 6 and a muffler 7, of an exhaust path Y (see FIG. 5).

Figure 6:
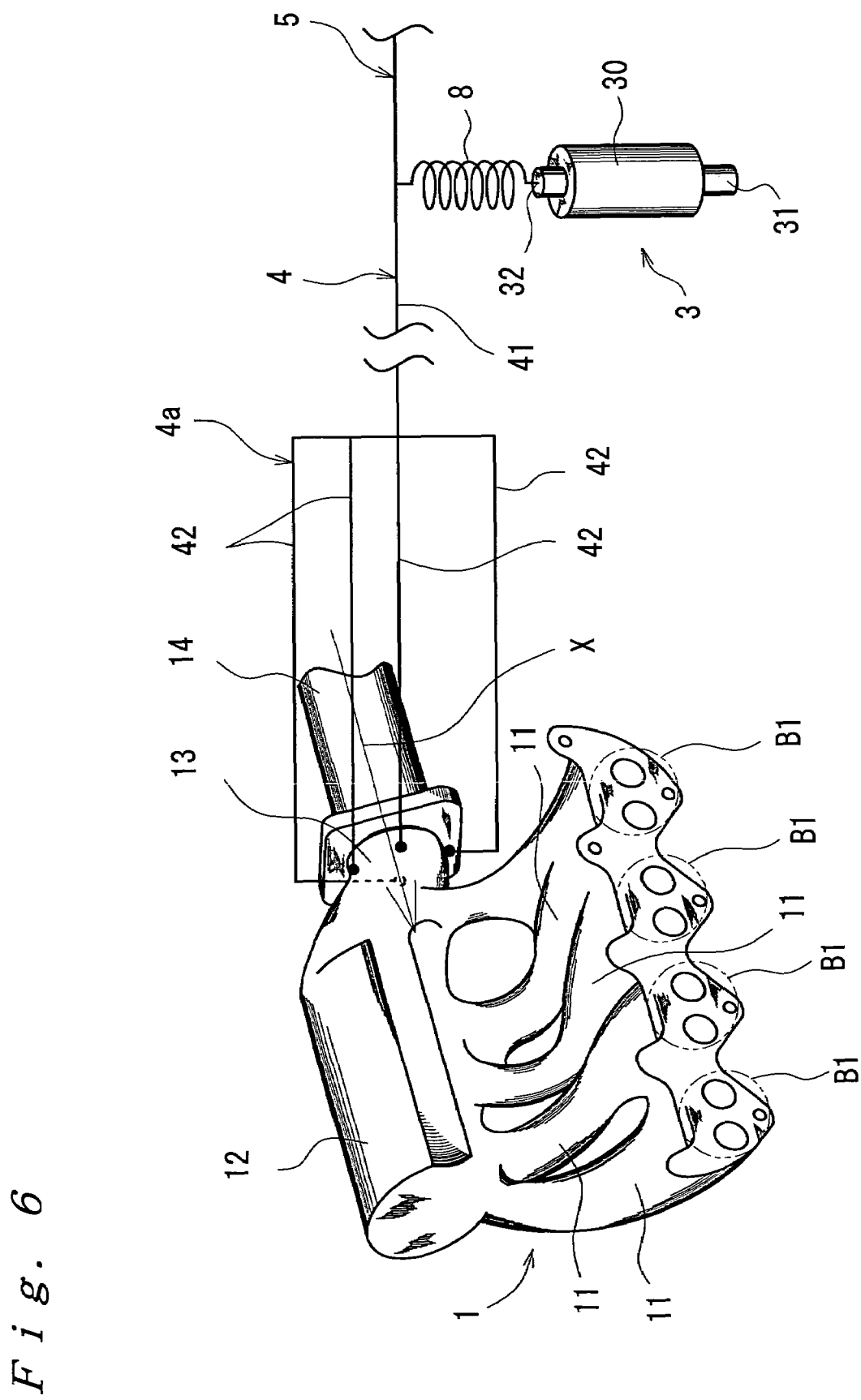
FIG. 6 is a schematic perspective view showing an auxiliary-gas supplying apparatus for internal combustion engine according to a second embodiment of the invention.
Figure 7A:
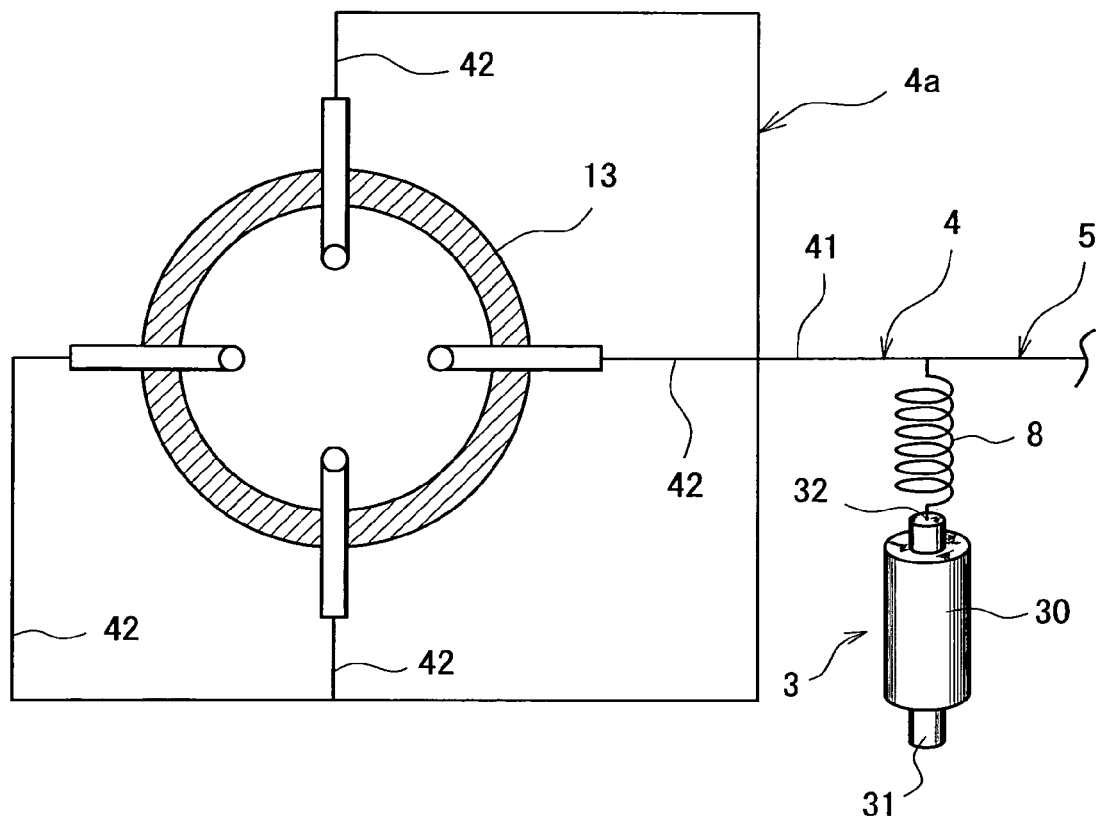
FIG. 7 is a group of sectional views showing an essential part of FIG. 6, FIG. 7(*a*) showing the part in radial section, FIG. 7(*b*) showing the part in axial section.
Figure 7B:
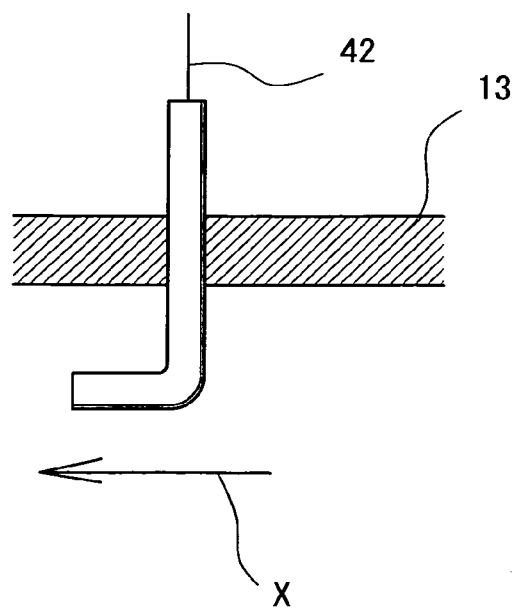

FIG. 6 is a schematic perspective view showing an auxiliary-gas supplying apparatus for internal combustion engine according to a second embodiment of the invention. FIG. 7 shows an essential part of the apparatus in section. In this embodiment, the intake auxiliary-gas supply path 4 is connected with a collecting pipe 13 of the intake manifold 1. More specifically, the second supply pipes 42 constituting the branch path 4a of the above-mentioned intake auxiliary-gas supply path 4 are connected to the collecting pipe 13 at plural circumferential places (four places shown in FIG. 4) spaced with equal intervals. The auxiliary-gas supplying apparatus A according to this embodiment is capable of effectively increasing the combustion efficiency of the internal combustion engine B because, just as in the first embodiment, the ozone generator 3 generates ozone while the auxiliary gas generator 8 forcibly decomposes at least a part of the resultant ozone, thereby generating the auxiliary gas containing ionized oxygen. In addition, the auxiliary gas obtained by the combination of the ozone generator 3 and the auxiliary gas generator 8 can be supplied to the collecting pipe 13 of the intake manifold 1 through the plural circumferential places thereof, so that the air-fuel mixture containing the auxiliary gas can be evenly distributed to the intake ports B1 of the internal combustion engine B. Thus, the combustion efficiency of the engine can be increased effectively. If the above-mentioned auxiliary gas is supplied to the collecting pipe 13 through only one circumferential place thereof, the branch pipes 11 closer to the collecting pipe 13 take in more of the auxiliary gas so supplied and hence, the branch pipes 11 farther away from the collecting pipe 13 receive little auxiliary gas. As a result, cylinders corresponding to the branch pipes 11 farther away from the collecting pipe 13 cannot be increased in the combustion efficiency.

In this embodiment, the second supply pipes 42 are connected to the collecting pipe 13 at the plural circumferential places thereof. Alternatively, the second supply pipes 42 may be connected to an intake pipe which is continuous upstream of the collecting pipe at plural circumferential places thereof.

The invention is not limited to the foregoing embodiments. For instance, the invention may be applied to other internal combustion engines such as diesel engines, or to other combustion engines such as boilers and incinerators. As to the internal combustion engine such as the diesel engine having a low intake pressure (negative pressure) for the air-fuel mixture, the intake auxiliary-gas supply path 4, the exhaust auxiliary-gas supply path 5 and such may preferably be provided with pumps or fans for forcibly feeding the auxiliary gas generated by the ozone generator 3 and the auxiliary gas generator 8 to the intake manifold 1 and the exhaust manifold 2.

As a matter of course, the intake manifold as the intake member may be not only made from a variety of synthetic resin, but may also be made from a variety of metals known in the art. Furthermore, the exhaust manifold as the exhaust member may also be made from a variety of synthetic resin and metals.

The exhaust path may be constituted such that the auxiliary gas generator is not interposed in the path but the ozone generator is connected to an exhaust ozone supply path for supplying an ozone-containing air flow to the exhaust path.

According to the invention, the auxiliary gas generator for generating the auxiliary gas containing ionized oxygen is provided such that the air-fuel mixture can be activated by the ionized oxygen. Therefore, the combustion engine can be effectively increased in the combustion efficiency.

What is claimed is:

1. An auxiliary-gas supplying apparatus for combustion engine disposed externally of an intake member communicated with a combustion chamber, comprising:
    an ozone generator for generating ozone by using air;
    an auxiliary gas generator for generating an auxiliary gas containing ionized oxygen by forcibly decomposing at least a part of the ozone generated by the ozone generator; and
    an intake auxiliary-gas supply path for supplying the auxiliary gas which is generated by the auxiliary gas generator and which contains the ionized oxygen, to the intake member,
    the auxiliary gas generator is constructed by spirally winding a tubular body including a plurality of bulges protruded inwardly from an inside wall thereof.

2. The auxiliary-gas supplying apparatus for combustion engine according to claim 1, wherein the intake member is an intake manifold, and
    wherein the intake auxiliary-gas supply path is in discrete communication with individual branch pipes of the intake manifold.

3. The auxiliary-gas supplying apparatus for combustion engine according to claim 1, wherein the intake member is an intake manifold, and
    wherein the intake auxiliary-gas supply path includes a branch path for supplying the auxiliary gas through plural circumferential places of a collecting pipe of the intake manifold or of an intake pipe communicated with the collecting pipe.

4. The auxiliary-gas supplying apparatus for combustion engine according to claim 1, wherein the intake member is made from a synthetic resin.

5. The auxiliary-gas supplying apparatus for combustion engine according to claim 1, further comprising an exhaust auxiliary-gas supply path for supplying the auxiliary gas which is generated by the auxiliary gas generator and which contains the ionized oxygen, to an exhaust path.

* * * * *

UNITED STATES PATENT AND TRADEMARK OFFICE
CERTIFICATE OF CORRECTION

PATENT NO. : 7,568,473 B2  Page 1 of 1
APPLICATION NO. : 12/213101
DATED : August 4, 2009
INVENTOR(S) : Kazuo Motouchi It is certified that error appears in the above-identified patent and that said Letters Patent is hereby corrected as shown below:

\*\*Title Page, Item 73, please change the Assignee's name from "Kazou Motouchi; Kobe-Shi (JP); Kyoko Motouchi, Kobe-Shi (JP); Sakoto Fujiwara, Kobe-Shi (JP)" to -- Kazuo Motouchi, Kobe-Shi (JP); Kyoko Motouchi, Kobe-Shi (JP); Satoko Fujiwara, Kobe-Shi (JP) --.\*\*

Signed and Sealed this

Fifteenth Day of June, 2010

David J. Kappos
*Director of the United States Patent and Trademark Office*